(12) United States Patent
Kim

(10) Patent No.: US 11,212,295 B2
(45) Date of Patent: Dec. 28, 2021

(54) DATA COMMUNICATION METHOD AND APPARATUS FOR VEHICLE NETWORK

(71) Applicant: HYUNDAI MOBIS CO., LTD., Seoul (KR)

(72) Inventor: Seung Tak Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 641 days.

(21) Appl. No.: 16/138,850

(22) Filed: Sep. 21, 2018

(65) Prior Publication Data

US 2019/0098017 A1 Mar. 28, 2019

(30) Foreign Application Priority Data

Sep. 25, 2017 (KR) .................. 10-2017-0123240

(51) Int. Cl.
| | |
|---|---|
| *H04L 12/28* | (2006.01) |
| *H04L 29/06* | (2006.01) |
| *H04W 4/44* | (2018.01) |
| *H04W 12/12* | (2021.01) |
| *H04W 4/48* | (2018.01) |
| *H04L 12/801* | (2013.01) |
| *H04L 29/08* | (2006.01) |

(52) U.S. Cl.
CPC ............ *H04L 63/123* (2013.01); *H04L 47/34* (2013.01); *H04L 63/1425* (2013.01); *H04L 63/1458* (2013.01); *H04L 67/12* (2013.01); *H04W 4/44* (2018.02); *H04W 4/48* (2018.02); *H04W 12/12* (2013.01)

(58) Field of Classification Search
CPC ....... H04L 1/0061; H04L 29/06; H04L 29/08; H04L 43/0847; H04L 47/34; H04L 63/123; H04L 63/1425; H04L 63/1458; H04L 67/12; H04W 4/44; H04W 4/48; H04W 12/12
See application file for complete search history.

(56) References Cited

U.S. PATENT DOCUMENTS 9,225,544 B2 * 12/2015 Mabuchi ............ H04L 12/4035
9,426,164 B2 *  8/2016 Otsuka ............... H04L 63/1441
(Continued)

OTHER PUBLICATIONS

Office Action issued in corresponding Chinese Patent Application No. 201811100853.7 dated Sep. 2, 2021, with English translation.

*Primary Examiner* — Frank Duong
(74) *Attorney, Agent, or Firm* — Morgan, Lewis & Bockius LLP

(57) ABSTRACT

A data communication method of a vehicle network may include: receiving, by a reception controller, a message from a transmission controller; determining, by the reception controller, whether a message sequence normally increases; determining, by the reception controller, the number of normally received messages in the message sequence, when it is determined that the message sequence normally increases; performing, by the reception controller, error verification on the received message, when it is determined that the number of normally received messages is equal to or more than a preset number; and processing, by the reception controller, the received message as a normal message when the error verification result for the received message indicates that no error is present in the received message.

6 Claims, 4 Drawing Sheets

(56) References Cited

U.S. PATENT DOCUMENTS

| | | | |
|---|---|---|---|
| 10,778,696 B2 * | 9/2020 | Miyashita | H04L 12/40 |
| 10,798,114 B2 * | 10/2020 | Galula | H04L 63/123 |
| 2017/0013005 A1 | 1/2017 | Galula et al. | |
| 2019/0191020 A1 * | 6/2019 | Hamada | H04L 43/062 |

* cited by examiner

FIG. 3

| TRANSMITTED MESSAGE | #1 | | #2 | | #3 | | #1 | | #2 | | #3 | |
|---|---|---|---|---|---|---|---|---|---|---|---|---|
| RECEIVED MESSAGE | #1 | | #2 | #3' | #3 | | #1 | #3' | #2 | #3' | #3 | |
| UNAUTHORIZED ACCESS (#3') | NORMAL | | NORMAL→ABNORMAL | ABNORMAL | ABNORMAL | | ABNORMAL | ABNORMAL | ABNORMAL | ABNORMAL | ABNORMAL | |
| MESSAGE SEQUENCE INCREASE | NORMAL | | NORMAL | NORMAL | ABNORMAL | | NORMAL | ABNORMAL | ABNORMAL | NORMAL | ABNORMAL | |
| NUMBER OF NORMALLY RECEIVED MESSAGES | 3 | | 4 | 5 | 0 | | 0 | 0 | 0 | 0 | 0 | |

FIG. 4

| TRANSMITTED MESSAGE | #1 | #2 | | #3 | | #1 | | #2 | #3 | #1 |
|---|---|---|---|---|---|---|---|---|---|---|
| RECEIVED MESSAGE | #1 ← | #2 ← | #3' ← | #3 ← | #3' ← | #1 ← | | #2 ← | #3 ← | #1 ← |
| UNAUTHORIZED ACCESS (#3') | NORMAL | NORMAL →ABNORMAL | NORMAL ABNORMAL | ABNORMAL | ABNORMAL | ABNORMAL | | ABNORMAL | NORMAL | NORMAL |
| MESSAGE SEQUENCE INCREASE | NORMAL | NORMAL | 5 | 0 | 0 | NORMAL | | NORMAL | NORMAL | NORMAL |
| NUMBER OF NORMALLY RECEIVED MESSAGES | 3 | 4 | 5 | 0 | 0 | 1 | | 2 | 3 | 4 |

DATA COMMUNICATION METHOD AND APPARATUS FOR VEHICLE NETWORK

CROSS-REFERENCES TO RELATED APPLICATIONS

The present application claims priority to Korean application number 10-2017-0123240, filed on Sep. 25, 2017, which is incorporated by reference in its entirety.

BACKGROUND OF THE INVENTION

The present invention relates to a data communication method and apparatus for a vehicle network, and more particularly, to a data communication method and apparatus for a vehicle network, which can check the message sequence of a received message and the number of normally received messages and perform error verification on the received message, thereby blocking an access of an unauthorized abnormal message.

Recently, with the change of the automobile industry environment, the percentage of electronic and electric parts (hereafter, referred to as electronic parts) among parts and systems included in a vehicle has increased, and the importance of software has also increased. Furthermore, various functions and services are provided through communication between electronic control units (ECU) through a distributed network within the vehicle.

Therefore, the importance of vehicle functional safety has been emphasized, and the ISO 26262 standard which is the international standard on the vehicle design considering the functional safety has been established. The vehicle functional safety may be considered in order to increase the reliability of a product by reducing the failure rates of electronic parts in a vehicle, to improve a driver's safety through a failure diagnosis and safety mechanism, and to raise the availability of the vehicle through a product design process and a maintenance system.

Furthermore, vehicles have been evolved to provide various services through communication between parts in each of the vehicles, communication between the vehicle and traffic infrastructures therearound (V2I), communication between the vehicle and vehicles therearound (V2V), and communication between the vehicle and a driver's smart phone. As the network communication is adopted in the vehicle and parts of the vehicle, much attention has been paid to platooning and autonomous driving.

However, the increase in percentage of electronic parts and software and the service delivery through communication connectivity may expose the vehicle to a security risk.

For example, when a security attack causes an intentional error in the electronic parts or software, the availability and safety which are guaranteed as the functional safety may be reduced.

The related art of the present invention is disclosed in Korean Patent Publication No. 2017-0055648 published on May 22, 2017, and entitled "Security communication device of in-vehicle network".

Therefore, most vehicle networks protect data using a checksum or CRC (Cyclic Redundancy Check). Such a mechanism is applied to protect application data, because an error may destroy the data after the error is transmitted from a gateway or software layer within an ECU through the network.

As such, in order to detect false data or omitted data through an end-to-end protection method, the mechanism verifies a message error using an additional checksum or CRC, and determines a loss or omission of the message by checking transmission time information using a sequence counter. Therefore, the mechanism checks the problem of a message received during communication between ECUs, thereby providing reliable communication.

However, such a security approach may not provide against an unauthorized access from outside. When an unauthorized access makes replicates a specific message and transmits the replicated message in a data transmission cycle, a normal message may be misjudged as an abnormal message, or an abnormal message may be misjudged as a normal message.

At this time, when a normal message is misjudged as an abnormal message, it may indicate that the normal message is delayed or not received. Typically, most vehicle networks prepare against such a case. However, the vehicle networks make no preparation against the case in which an abnormal message is misjudged as a normal message. Therefore, a dangerous situation may occur.

SUMMARY OF THE INVENTION

Embodiments of the present invention are directed to a data communication method and apparatus for a vehicle network, which can check the message sequence of a received message and the number of normally received messages and perform error verification on the received message, thereby blocking an access of an unauthorized abnormal message.

In one embodiment, a data communication method of a vehicle network may include: receiving, by a reception controller, a message from a transmission controller; determining, by the reception controller, whether a message sequence normally increases; determining, by the reception controller, the number of normally received messages in the message sequence, when it is determined that the message sequence normally increases; performing, by the reception controller, error verification on the received message, when it is determined that the number of normally received messages is equal to or more than a preset number; and processing, by the reception controller, the received message as a normal message when the error verification result for the received message indicates that no error is present in the received message.

The data communication method may further include: processing, by the reception controller, the previously received message as an abnormal message, when it is determined that the message sequence abnormally increases; and processing, by the reception controller, the received message as an abnormal message.

The processing of the previously received message as the abnormal message may include recovering, by the reception controller, the normal message before the previously received message into the last normal message, when the previously received message is a normal message.

The data communication method may further include processing, by the reception controller, the received message as an abnormal message, when it is determined that the number of normally received messages is less than the preset number.

The data communication method may further include processing, by the reception controller, the received message as an abnormal message, when the error verification result for the received message indicates that an error is present in the received message.

In another embodiment, a data communication apparatus of a vehicle network may include: a transmission controller configured to transmit a message when communication is performed between electronic parts in a vehicle; and a reception controller configured to receive the message from the transmission controller. The reception controller may determine whether the message sequence of the message normally increases, determine the number of normally received messages in the message sequence when the message sequence normally increases, perform error verification on the received message when the number of normally received messages in the message sequence is equal to or more than a preset number, and process the received message as a normal message when the error verification result for the received message indicates that no error is present in the received message.

When the message sequence abnormally increases, the reception controller may process the previously received message as an abnormal message, and process the received message as an abnormal message.

The reception controller may recover the normal message before the previously received message into the last normal message, when the previously received message is a normal message.

When the number of normally received messages in the message sequence is less than the preset number, the reception controller may process the received message as an abnormal message.

When the error verification result for the received message indicates that an error is present in the received message, the reception controller may process the received message as an abnormal message.

BRIEF DESCRIPTION OF THE DRAWINGS

FIGS. 3 and 4 illustrate a data receiving process through the data communication method for a vehicle network in accordance with the embodiment of the present invention.

DESCRIPTION OF SPECIFIC EMBODIMENTS

Hereafter, a data communication method and apparatus for a vehicle network in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
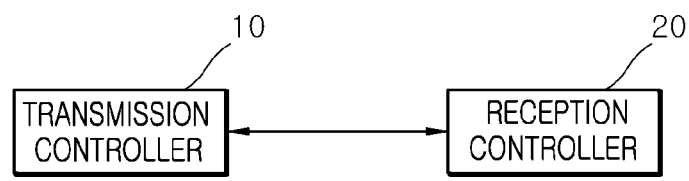
FIG. 1 is a block configuration diagram illustrating a data communication apparatus for a vehicle network in accordance with an embodiment of the present invention.

FIG. 1 is a block configuration diagram illustrating a data communication apparatus for a vehicle network in accordance with an embodiment of the present invention.

As illustrated in FIG. 1, the data communication apparatus for a vehicle network may include a transmission controller 10 and a reception controller 20.

When communication between electronic parts within a vehicle is performed, one electronic part to transmit a message may be referred to as the transmission controller 10, and the other electronic part to receive the message from the transmission controller 10 may be referred to as the reception controller 20. Therefore, when messages are transmitted/received between electronic parts, the transmission controller 10 and the reception controller 20 are not limited to specific electronic parts. For example, the transmission controller 10 may correspond to a first electronic part within the vehicle, and the reception controller 20 may correspond to a second electronic part which receives a message from the transmission controller 10. In an embodiment, the transmission controller 10 may correspond to a transmitter unit which is included in the first electronic part and includes a processor, and the reception controller 20 may correspond to a receiver unit which is included in the second electronic part and includes a processor.

The transmission controller 10 may sequentially transmit messages to the reception controller 20 connected to the vehicle network, according to a preset sequence.

The reception controller 20 may receive the messages from the transmission controller 10 through the vehicle network, and determine whether the sequence normally increases or whether the number of normally received messages in the message sequence is equal to or more than a preset number. Then, the reception controller 20 may perform error verification on the received messages, and process the received messages as normal messages or process the received messages as abnormal messages to block an access of the abnormal messages.

When it is determined that the message sequence does not normally increase, the reception controller 20 may process the previously received message as an abnormal message. Thus, when the previously received message is a normal message, the reception controller 20 may process the previously received message as an abnormal message, and not only recover the normal message before the previously received message, but also process the currently received message as an abnormal message. At this time, when the previously received message is an abnormal message, the reception controller 20 may maintain the abnormal message state.

On the other hand, when it is determined that the message sequence normally increases, the reception controller 20 may additionally count the number of normally received messages in the message sequence, and determine whether the number of normally received messages is equal to or more than the preset number.

That is, when the number of normally received messages in the message sequence is less than the preset number, the reception controller 20 may process a received message as an abnormal message. However, when the number of normally received messages in the message sequence is equal to or more than the preset number, the reception controller 20 may perform error verification on the received message.

As such, when the message sequence normally increases and the number of normally received messages in the message sequence is equal to or more than the preset number, the reception controller 20 may perform error verification on the received message. When the received message has no error, the reception controller 20 may process the received message as a normal message. On the other hand, when the received message has an error, the reception controller 20 may process the received message as an abnormal message, and thus block an access of the unauthorized abnormal message.

This process will be described in detail as follows.

Figure 2:
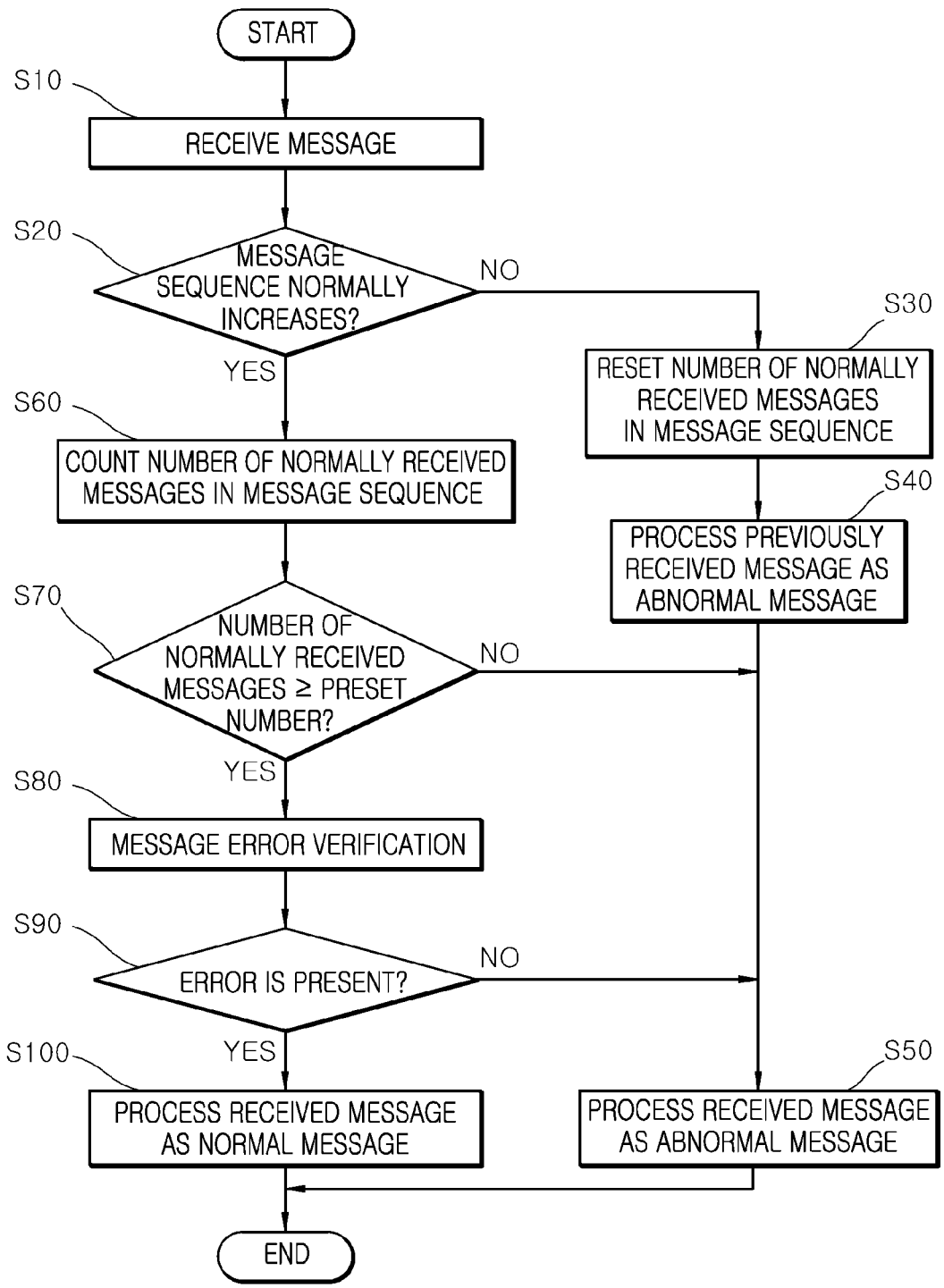
FIG. 2 is a flowchart illustrating a data communication method for a vehicle network in accordance with an embodiment of the present invention.

FIG. 2 is a flowchart illustrating a data communication method for a vehicle network in accordance with an embodiment of the present invention.

As illustrated in FIG. 2, the data communication method for a vehicle network in accordance with the present embodiment may begin with step S10 in which the reception controller 20 receives a message from the transmission controller 10.

After receiving the message at step S10, the reception controller 20 may determine whether a message sequence normally increases, at step S20.

When it is determined at step S20 that the message sequence of the received message does not normally increase, the reception controller 20 may determine that the received message is abnormal, and reset the number of normally received messages in the message sequence, at step S30.

The reception controller 20 may process the previously received message as an abnormal message at step S40.

When the message sequence is abnormal, it may indicate that the previously received message is likely to be a message of an unauthorized access. Thus, the reception controller 20 may process the previously received message as an abnormal message, and recover the normal message before the previously received message into the last normal message. However, when the previously received message is abnormal, the reception controller 20 may maintain the abnormal message state.

After processing the previously received message as an abnormal message at step S40, the reception controller 20 may also process the currently received message as an abnormal message at step S50.

When it is determined at step S20 that the message sequence of the received message normally increases, the reception controller 20 may count the number of normally received messages in the message sequence, at step S60.

After counting the number of normally received messages in the message sequence at step S60, the reception controller 20 may determine whether the number of normally received messages is equal to or more than the preset number, at step S70.

The preset number may be set to the number at which it can be determined that the message sequence normally increases and the messages are normally received because a message of an unauthorized access has disappeared.

When it is determined at step S70 that the number of normally received messages is less than the preset number, the reception controller 20 may process the received message as an abnormal message at step S50.

When the number of normally received messages in the message sequence is less than the preset number even though the message sequence of the unauthorized access sequentially increases, the reception controller 20 may process the received message as an abnormal message.

Furthermore, when the number of normally received messages in the message sequence is not equal to or more than the preset number even though the message of the unauthorized access temporarily disappears, the reception controller 20 may process the received message as an abnormal message.

When it is determined at step S70 that the number of normally received messages in the message sequence is equal to or more than the preset number, the reception controller 20 may perform error verification on the received data at step S80.

The reception controller 20 may verify an error on the received data by checking the checksum or CRC of the received data.

After performing the error verification at step S80, the reception controller 20 may determine whether an error is present in the received data, at step S90.

When it is determined at step S90 that an error is present in the received data, the reception controller 20 may process the received data as an abnormal message at step S50.

On the other hand, when it is determined at step S90 that no error is present in the received data, the reception controller 20 may process the received data as a normal message at step S100.

FIGS. 3 and 4 illustrate a data receiving process through the data communication method for a vehicle network in accordance with the embodiment of the present invention.

FIG. 3 illustrates that an unauthorized message #3' continuously accesses during a data receiving process in the data communication method for a vehicle network in accordance with the embodiment of the present invention.

FIG. 3 is based on the supposition that it is determined that no error is present in the message, during error verification.

The transmission controller 10 may transmit messages according to a message sequence of #1, #2, #3, #1, #2, #3 . . . . However, when the unauthorized message #3' is transmitted in the transmission cycle, the reception controller 20 may receive the messages according to a message sequence of #1, #2, #3', #3, #3', #1, #3', #2, #3', #3.

In this case, although the message #3' is received after the message #2, the reception controller 20 may determine that the message sequence normally increases, determine that the number of normally received messages in the message sequence is equal to or more than a preset number of 3, and process the received messages as normal messages.

At this time, suppose that the messages #1 and #2 are normal messages, which means that the message sequence is normal, and the number of normally received messages in the message sequence is equal to or more than 3.

However, when the message #3 is received afterwards, the reception controller 20 may determine that the message sequence is abnormal, reset the number of normally received messages in the message sequence, process the previously received message #3' as an abnormal message, and also process the message #3 as an abnormal message.

Then, when the message #3' is received again, the reception controller 20 may process the message #3' as an abnormal message, because the message sequence is abnormal and the number of normally received messages in the message sequence was reset.

At this time, when the message #1 is received after the message #3', the reception controller 20 may determine that the message sequence is normal. However, the reception controller 20 may process the message #1 as an abnormal message, because the number of normally received messages in the message sequence is less than the preset number.

As such, when the number of normally received messages in the message sequence is not equal to or more than the preset number even though it is determined that the message sequence is temporarily normal, the reception controller 20 may continuously process the corresponding message as an abnormal message.

On the other hand, FIG. 4 illustrates that the unauthorized message #3' temporarily accesses and then disappears. In this case, although the message sequence normally increases when the normal message #1 is received after the message #3', the reception controller 20 may process the message #1 as an abnormal message, because the number of normally received messages in the message sequence is 1, which is less than the preset number.

Then, when the unauthorized message #3' is not received, but the message #2 is received, the reception controller 20 may determine that the message sequence normally increases, count the number of normally received messages in the message sequence, and increase the count value. However, since the number of normally received messages is less than the preset number, the reception controller 20 may process the message #2 as an abnormal message.

However, when the normal message #3 is subsequently received, the reception controller 20 may determine that the message sequence is normal, and increase the number of normally received messages in the message sequence such that the number of normally received messages is equal to or more than the preset number. Thus, the reception controller 20 may process the message #3 as a normal message.

As such, when the number of normal messages in the normal message sequence is not equal to or more than the preset number even though the message of the unauthorized access disappears, the reception controller 20 may process the received messages as abnormal messages.

In accordance with the embodiments of the present invention, the data communication apparatus and method for a vehicle network can check the message sequence and the number of normally received messages and verify a message error, when data are received. Therefore, the data communication apparatus and method can block an access of an unauthorized abnormal message, thereby not only preventing misjudgment caused by an unauthorized access, but also reducing a dangerous situation caused by misjudgment.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A data communication method of a vehicle network, comprising:
   receiving, by a reception controller, a message from a transmission controller;
   determining, by the reception controller, whether a message sequence increases in a normal manner or in an abnormal manner;
   upon determining that the message sequence increases in the normal manner, determining, by the reception controller, a number of received messages in the normal manner in the message sequence;
   upon determining that the number of received in the normal manner messages is equal to or more than a preset number, performing, by the reception controller, error verification on a currently received message among the received messages;
   in response to performing the error verification in which an error verification result indicates that no error is present in the currently received message, processing, by the reception controller, the currently received message as normal message; and
   upon determining that the message sequence increases in the abnormal manner, processing, by the reception controller, a previously received message, that was received right before the currently received message, as abnormal message and processing the currently received message as abnormal message;
   determining whether the previously received message is normal message or abnormal message based on the message sequence; and
   upon determining that the previously received message is normal message, recovering a normal message received before the previously received message into last normal message.

2. The data communication method of claim 1, further comprising, upon determining that the number of received messages in the normal manner is less than the preset number, processing, by the reception controller, the received message as abnormal message.

3. The data communication method of claim 1, further comprising, in response to an error verification result of the currently received message indicating that an error is present in the currently received message, processing, by the reception controller, the received message as abnormal message.

4. A data communication apparatus of a vehicle network, comprising:
   a transmission controller configured to transmit a message when communication is performed between electronic parts in a vehicle; and
   a reception controller configured to receive the message from the transmission controller,
   wherein the reception controller:
      determines whether a message sequence of the message increases in a normal manner or in an abnormal manner,
      when the message sequence increases in the normal manner, determines a number of received messages in the message sequence,
      when the number of received messages in the normal manner is equal to or more than a preset number, performs error verification on a currently received message among the received messages,
      when an error verification result for the currently received message indicates that no error is present in the currently received message, processes the currently received message as normal message,
      when the message sequence increases in the abnormal manner, the reception controller processes a previously received message, which was received right before the currently received message, as abnormal message, and processes the currently received message as abnormal message, and
      when the previously received message is normal message, the reception controller recovers a normal message received before the previously received message into last normal message.

5. The data communication apparatus of claim 4, wherein, when the number of received messages in the normal manner is less than the preset number, the reception controller processes the currently received message as abnormal message.

6. The data communication apparatus of claim 4, wherein, when the error verification result for the currently received message indicates that an error is present in the currently received message, the reception controller processes the currently received message as abnormal message.

* * * * *